(12) United States Patent
Meguro et al.

(10) Patent No.: US 7,111,962 B2
(45) Date of Patent: Sep. 26, 2006

(54) LIGHT SOURCE AND PROJECTOR

(75) Inventors: Hiroyuki Meguro, Matsumoto (JP);
Takeshi Takezawa, Matsumoto (JP);
Masakazu Kitamura, Matsumoto (JP);
Motoyuki Fujimori, Suwa (JP); Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 10/806,173

(22) Filed: Mar. 23, 2004

(65) Prior Publication Data

US 2004/0233675 A1  Nov. 25, 2004

(30) Foreign Application Priority Data

| Mar. 25, 2003 | (JP) | ............................. 2003-083004 |
| Aug. 27, 2003 | (JP) | ............................. 2003-302654 |
| Mar. 18, 2004 | (JP) | ............................. 2004-077998 |

(51) Int. Cl.
*F21V 7/20* (2006.01)
*F21V 7/00* (2006.01)

(52) U.S. Cl. ...................... 362/294; 362/264; 362/345; 362/335

(58) Field of Classification Search ................ 362/264, 362/294, 345, 335
See application file for complete search history.

(56) References Cited

U.S. PATENT DOCUMENTS

| 5,091,835 | A * | 2/1992 | Malek et al. ................ 362/294 |
| 6,210,024 | B1 * | 4/2001 | Shida .......................... 362/345 |
| 6,398,367 | B1 | 6/2002 | Watanabe |
| 6,527,417 | B1 * | 3/2003 | Basey ........................ 362/264 |

2002/0039174 A1  4/2002  Yamada et al.

FOREIGN PATENT DOCUMENTS

| GB | 431416 | 7/1935 |
| GB | 678906 | 9/1952 |
| JP | 01-211705 | 8/1989 |
| JP | 08-262437 | 10/1996 |
| JP | A 09-120067 | 5/1997 |
| JP | A 11-329015 | 11/1999 |
| JP | 2001-332221 | 11/2001 |
| JP | A-2002-107823 | 4/2002 |
| JP | 2002-313119 | 10/2002 |
| JP | 2002-319313 | 10/2002 |
| JP | 2003-075915 | 3/2003 |

* cited by examiner

*Primary Examiner*—Sandra O'Shea
*Assistant Examiner*—Anabel Ton
(74) *Attorney, Agent, or Firm*—Oliff & Berridge, PLC (57) ABSTRACT

A light source that prevents broken pieces from dispersing to the outside without increasing the number of components while efficiently cooling a light-emitting tube is provided. The light source (10) has: a light-emitting tube (11) having a light-emitting portion (111) where light beam is emitted by electric discharge between electrodes and a sealing portion (112) provided on both sides of the light-emitting portion (111); a reflector (12) that reflects the light beam emitted by the light-emitting tube (11) forward after aligning in a predetermined direction; a cover (16) covering a light-irradiation opening of the reflector (12) and having an opening for irradiating the light beam reflected by the reflector (12), the cover having a heat-radiation fin (162) on the outside thereof and being made of a heat-conductive material to absorb the heat from the light-emitting tube (11), the absorbed heat being conducted to the heat-radiation fin (162); and a transparent member (14) that covers the opening of the cover (16).

21 Claims, 5 Drawing Sheets

LIGHT SOURCE AND PROJECTOR

BACKGROUND OF THE INVENTION

1. Field of the Invention

The present invention relates to a light source having a light-emitting tube including a light-emitting portion that emits light by electric discharge between electrodes and sealing portions provided on both sides of the light-emitting portion and a reflector that irradiates the light beam emitted by the light-emitting tube after aligning in a predetermined direction, and a projector having the light source.

2. Description of Related Art

Projectors that modulate a light beam irradiated by a light source in accordance with image information to project an optical image in an enlarged manner have been conventionally used for presentation purpose at conferences etc. On the other hand, such projectors are also used for home-theater purpose in response to increasing demand for watching movies etc. on a wide screen at home.

Light sources used for such projectors have a lamp housing accommodating a reflector and a discharge light-emitting tube such as a metal halide lamp and a high-pressure mercury lamp so that the light source can be attached to and detached from the projectors together with the lamp housing for the convenience of exchanging the light-emitting tube when the light-emitting tube fails to light or is exploded.

Since the light source is exchanged by users of the projectors, the light source is constructed in an explosion-proof manner where light-emitting opening of a reflector in which a light-emitting tube is disposed is covered with a transparent plate such as glass so that broken pieces of exploded light-emitting tube are not scattered around when the light source is detached from the projector.

On the other hand, since the light-emitting tube generates heat together with light, cooling air is preferably blown to cool the light-emitting tube in order to lengthen the life of the light-emitting tube.

A light source having both of the explosion-proof construction and the cooling mechanism has been known, where a pair of cooling-air-introducing openings are formed on the light-emitting opening of a reflector symmetrically around the light-emitting tube (see Japanese Patent Laid-Open Publication No. 2002-107823 [0047], [0048], FIG. 7).

The light source has a lid on the lamp housing for opening/closing the opening of the reflector. The lid is opened when the light source is attached to the projector to allow the cooling air to be introduced. On the other hand, when the light-emitting tube is exploded and the light source is detached from the projector for exchanging the light source, the lid shuts the opening of the reflector to prevent the broken pieces from scattering to the outside.

However, according to the light source disclosed in the Japanese Patent Laid-Open Publication No. 2002-107823, since the lid has to be provided on the lamp housing and a biasing member such as a helical spring is necessary for opening/closing the lid in attaching/detaching the light source to/from the projector, so that the number of components of the light source is increased to deteriorate the efficiency of the assembly work and production cost is increased in accordance with the increase in the number of the components. Further, when the light source is attached to the projector, since the lid is opened, some broken pieces may be scattered inside the projector.

SUMMARY OF THE INVENTION

An object of the present invention is to provide a light source that does not increase the number of components while preventing exploded pieces from scattering to the outside even when a light-emitting tube is exploded and is capable of efficiently cooling the light-emitting tube, and a projector having the light source.

A light source according to an aspect of the present invention includes: a light-emitting tube having a light-emitting portion that emits a light beam by an electric discharge between electrodes and sealing portions provided on both sides of the light-emitting portion; a reflector that reflects the light beam emitted by the light-emitting portion forward after aligning in a predetermined direction; a cover covering a light-irradiation opening of the reflector, the cover having an opening for irradiating the light beam reflected by the reflector and a heat-radiation fin formed on the outside thereof, the cover being made of a heat-conductive material that absorbs a heat generated by the light-emitting tube and conducts the absorbed heat to the heat-radiation fin; and a transparent member that covers the opening of the cover.

Various light-emitting tubes emitting light with high luminance may be used as the light-emitting tube, which may be metal halide lamp and high-pressure mercury lamp.

The reflector may be a parabola reflector and an ellipsoidal reflector. The reflecting surface of the reflector may preferably be a cold mirror that reflects visible light and transmits infrared radiation.

The cover may be made of various materials such as synthetic resin, metal and ceramics, which may preferably be metal or ceramics.

A heat-absorber of the cover opposing the reflector may be arranged so that the light from the light-emitting tube is not reflected thereon and not returned toward the reflector, where, for instance, V-shaped grooves are formed on the heat-absorber or the surface of the heat-absorber may be finished with anodized black-aluminum coating.

According to the above arrangement, since the heat from the light-emitting tube is exhausted to the outside using heat-conductivity of the cover, it is not necessary to form an opening for introducing cooling air on the reflector and complete explosion-proof construction can be achieved without increasing the number of the components of the light source.

When the cover is formed by synthetic resin etc., the cover may be deteriorated on account of the heat of the light-emitting tube and toxic gas such as siloxane may be generated. On the other hand, by constructing the cover with metal or ceramics, such disadvantages can be avoided and durability of the light source can be improved. Further, by forming the cover with metal, waste material of the cover of the light source of which light-emitting tube is exploded can be melt and used for other components.

In the above aspect of the present invention, the reflector may preferably be an ellipsoidal reflector having an ellipsoidal reflecting surface, and a sub-reflection mirror that covers approximately half of the front side of the light emitting portion may preferably be provided in the light-emitting tube, the light-emitting tube being projected from a light-irradiation opening of the ellipsoidal reflector.

According to the above arrangement, the light beam irradiated from the light-emitting portion of the light-emitting tube toward the front side thereof is reflected by the sub-reflection mirror and is again reflected by the reflector before being irradiated. Accordingly, since the light beam emitted forward from the light-emitting portion can be irradiated on the reflector by the sub-reflection mirror, little light beam is not reflected and irradiated by the reflector even when the length of the reflector in the optical axis direction is reduced, thereby enhancing the size reduction of the light source.

In the above aspect of the present invention, the cover may preferably have an approximately conic cylindrical heat absorber of which diameter is gradually decreased from the light-irradiation opening of the reflector toward the light-irradiation side.

The conic section of the heat-absorber may preferably be tapered along the light beam converged by the ellipsoidal reflector.

According to the above arrangement, since the heat-absorber has the tapered shape, even when the light beam reflected by the reflector collides with the heat-absorber, the reflected light beam is not returned toward the reflector again as a stray light, so that the light source can irradiate appropriate light beam.

In the above aspect of the present invention, the heat-radiation fin may preferably be a plate provided on the outside of the heat-absorber extending in a direction orthogonal to the optical axis of the reflector.

According to the above arrangement, since the heat-radiation fin is constructed by a plate extending in a direction orthogonal to the optical axis of the reflector, a cooling fan can be disposed on a side of the light source in the light-source accommodating portion of the projector, so that the light source can be efficiently cooled by the cooling fan.

In the above aspect of the present invention, the transparent member may preferably be a parallelizing lens that parallelizes a convergent light irradiated by the ellipsoidal reflector, and the parallelizing lens may preferably be a parallelizing concave lens.

According to the above arrangement, the convergent light of the ellipsoidal reflector can be parallelized and the light-emitting tube can be sealed by the cover and the parallelizing lens, the number of components of the light source can be further reduced.

In the above aspect of the present invention, the parallelizing lens may preferably be a parallelizing concave lens having thickness of 2 mm or more along a direction for the light to be transmitted.

When the thickness of the parallelizing concave lens along the light-transmitting direction is not uniform, for instance, when the light-incident surface is concave surface and the light-irradiation surface is flat surface, the thinnest part may preferably be 2 mm or more.

When the thickness of the parallelizing concave lens along the light-transmitting direction is less than 2 mm, the parallelizing concave lens may be damaged when the light-emitting tube is exploded. On the other hand, in the present arrangement, since the thickness of the parallelizing concave lens is 2 mm or more, the parallelizing concave lens is not damaged even when the light-transmitting tube is exploded, thereby securely preventing the broken pieces of the exploded light-emitting tube from being dispersed.

In the above aspect of the present invention, a light-incident surface of the parallelizing concave lens may preferably be an aspherical concave surface and a light-irradiation surface thereof may preferably be a flat surface. Especially, the aspherical surface may preferably be a hyperboloid surface.

According to the above arrangement, since the light-incident surface of the parallelizing concave lens is aspherical concave surface and the light-irradiation surface is a flat surface, the light is not refracted on the light-irradiation surface, thereby improving parallelism of the irradiated light beam.

Since the light-incident surface of the parallelizing concave lens is concaved, the interference between the sealing portion of the light-emitting tube and the parallelizing concave lens can be prevented. Further, even when the light-emitting tube is exploded, the broken pieces of the light-emitting tube is not likely to collide with the parallelizing concave lens, thus more effectively preventing the damage on the parallelizing concave lens.

In the above aspect of the present invention, an ultraviolet protection film that prevents transmission of ultraviolet may preferably be formed on the light-irradiation surface of the parallelizing concave lens.

According to the above arrangement, since the Ultraviolet protection film for preventing the transmission of the ultraviolet is formed on the light-irradiation surface of the parallelizing concave lens, the irradiation of the ultraviolet from the light source can be prevented.

When the Ultraviolet protection film is formed on the concave side, the function of the Ultraviolet protection film may not be sufficiently exerted. On the other hand, since the Ultraviolet protection film is formed on the flat surface in the present arrangement, the function of the Ultraviolet protection film can be fully exerted.

Further, since the parallelizing concave lens has aspherical concave surface on the light-incident side, the light beam is parallelized on the light-incident side and the parallelized light beam is irradiated from the light-irradiation surface. However, when the Ultraviolet protection film is formed on the light-incident surface, a special Ultraviolet protection film in accordance with incident angle of the light beam must be used. On the other hand, in the above aspect of the present invention, since the Ultraviolet protection film is formed on the light-irradiation surface and the parallelized light beam is incident on the Ultraviolet protection film, general-type Ultraviolet protection film having light-incident angle of zero degree can be used, thereby reducing the production cost of the light source.

In the above aspect of the present invention, the cover may preferably be made of ceramics and a hole for inserting an electrode-connecting wire of the high-emitting tube may preferably be formed on the cover.

The hole for the electrode-connecting wire may preferably be formed at a position where the electrode-connecting wire is not displayed as a shadow and located on the lower side when the light source is accommodated in the projector.

According to the above arrangement, since the hole for the electrode-connecting wire is formed on the cover, it is not necessary to form a hole for the electrode-connecting wire on the reflector, so that distortion on the reflector generated when the reflector is molded can be prevented and optically highly accurate reflector can be provided on the light source, thereby enhancing the light utilization efficiency.

A projector according to another aspect of the present invention modulates a light beam irradiated by a light source in accordance with image information to form an optical image and projects the optical image in an enlarged manner, the projector including the above-described light source. The projector of the above aspect can obtain the same functions and advantages as the above-described light source.

Further, since the size of the light source can be easily reduced, size reduction of the projector itself is facilitated.

In the above aspect of the present invention, a cooling device that cools the heat-radiation fin formed on the cover of the light source may preferably be provided.

The cooling device may be a fan that blows a cooling air to the heat-radiation fin or a thermoelectric conversion element attached to the heat-radiation fin using the Peltier effect.

According to the above arrangement, since the projector is provided with the cooling device, the heat-radiation fin can be positively cooled, thereby further enhancing the cooling efficiency inside the light source.

DETAILED DESCRIPTION OF PREFERRED EMBODIMENT(S)

Embodiments of the present invention will be described below with reference to attached drawings.

Figure 1:
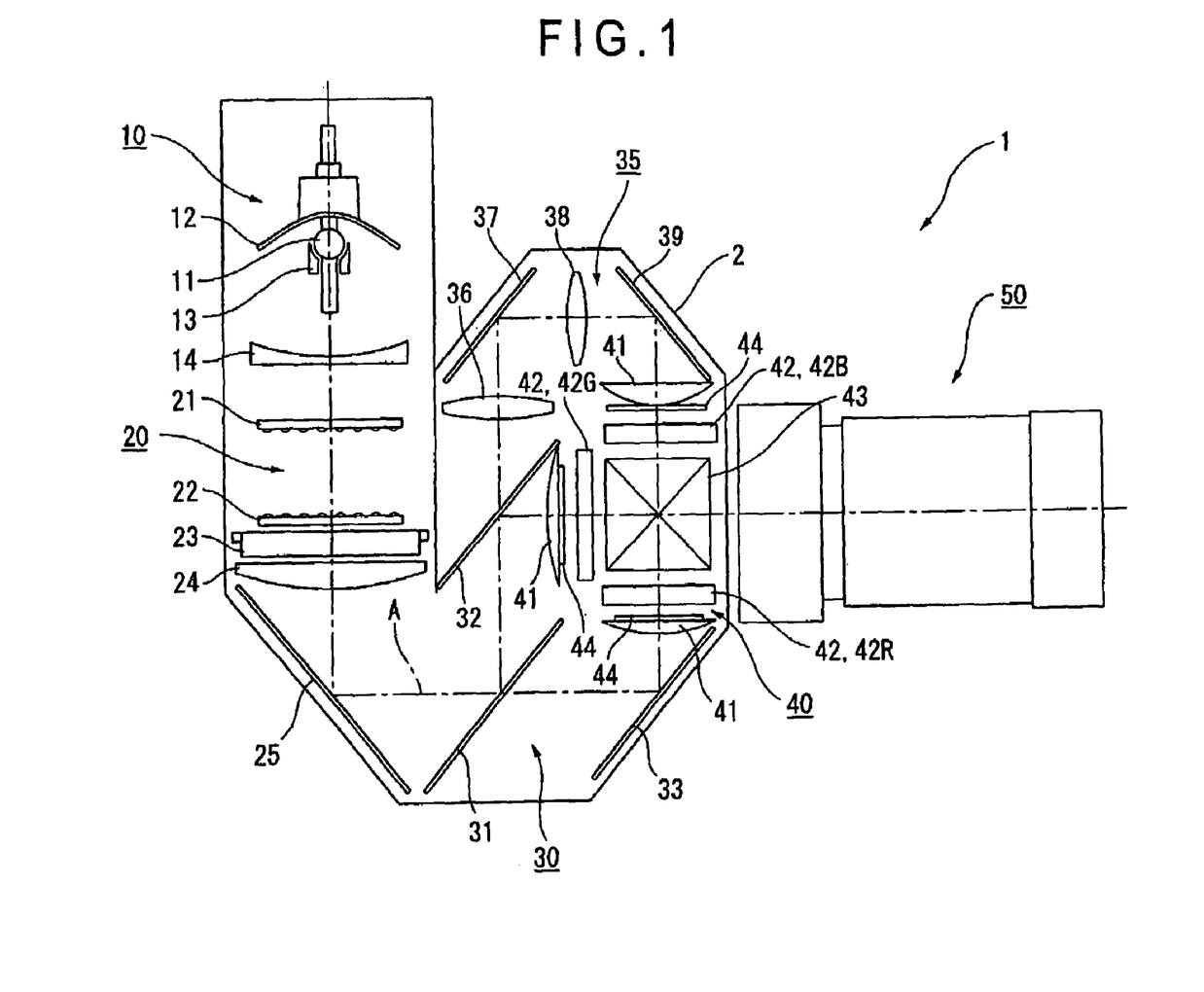
FIG. 1 is a schematic illustration showing a structure of an optical system of a projector according to a first embodiment of the present invention.

FIG. 1 is a schematic illustration showing an optical system of a projector 1 according to a first embodiment of the present invention. The projector 1 is an optical equipment that modulates a light beam emitted by a light source in accordance with image information to form an optical image and project the optical image on a screen in an enlarged manner, which includes a light source lamp unit 10 (a light source), an integrator illumination optical system 20, a color-separating optical system 30, a relay optical system 35, an optical device 40 and a projection optical system 50, the optical elements of the optical systems 20 to 35 being positioned and accommodated in a light guide 2 in which a predetermined illumination optical axis A is set.

The light source lamp unit 10 irradiates a light beam emitted by a light source lamp 11 forward after aligning in a predetermined direction to illuminate the optical device 40, which includes the light source lamp 11, an ellipsoidal reflector 12, a sub-reflection mirror 13 and a parallelizing concave lens 14 (details described below).

The light beam emitted by the light source lamp 11 is irradiated toward the front side of the equipment as a convergent light after irradiating direction thereof being aligned by the ellipsoidal reflector 12, which is parallelized by the parallelizing concave lens 14 to be irradiated on the integrator illumination optical system 20.

The integrator illumination optical system 20 splits the light beam irradiated by the light source lamp unit 10 into a plurality of sub-beams to integrate an in-plane luminance of an illumination area, which includes a first lens array 21, a second lens array 22, a PBS array 23, a condenser lens 24 and a reflection mirror 25.

The first lens array 21 is a light-beam splitting optical element for splitting the light beam irradiated by the light source lamp 11 into a plurality of sub-beams, which includes a plurality of small lenses arranged in a matrix in a plane orthogonal to the illumination optical axis A, the profile of the respective small lenses being substantially similar to the shape of each image formation area of liquid crystal panels 42R, 42G and 42B of the optical device 40 (described below).

The second lens array 22 is an optical element for condensing the plurality of sub-beams split by the first lens array 21 and also includes a plurality of small lenses arranged in a matrix in a plane orthogonal to the illumination optical axis A in the same manner as the first lens array 21. However, since the second lens array 22 is for condensing the light beams, it is not necessary that the profile of the respective small lenses thereof corresponds to the profile of the image formation area of the liquid crystal panels 42R, 42G and 42B.

The PBS array 23 is a polarization-converting element for aligning the polarization direction of the respective sub-beams split by the first lens array 21 into a uniform linear polarization.

Though not illustrated, the PBS array 23 has an alternating arrangement of polarization separating films and reflection mirrors inclined relative to the illumination optical axis A. The polarization separating film transmits one of P polarized light beam and S polarized light beam contained in the respective sub-beams and reflects the other polarized light beam. The reflected other polarized light beam is bent by the reflection mirror and is irradiated in the irradiation direction of the transmitted one polarized light beam, i.e. along the illumination optical axis A. Either one of the irradiated polarized light beams is polarization-converted by a phase plate provided on the light-irradiation surface of the PBS array 23 so that the polarization direction of all of the polarized light beams are aligned. With the use of the PBS array 23, the light beam irradiated by the light source lamp 11 can be aligned in a single polarized light beam, thereby enhancing the utilization ratio of the light source beam used in the optical device 40.

The condenser lens 24 is an optical element for condensing the plurality of sub-beams having passed through the first lens array 21, the second lens array 22 and the PBS array 23 to superpose the sub-beams on the image formation area of the liquid crystal panels 42R, 42G and 42B. The condenser lens 24 is a spherical lens having a flat surface on the incident-side of the light-transmission area and a spherical surface on the irradiation side in the present embodiment, but may alternatively be an aspherical lens having hyperboloid irradiation surface.

The light beam irradiated by the condenser lens 24 is bent by the reflection mirror 25 to be irradiated to the color-separating optical system 30.

The color-separating optical system 30 has two dichroic mirrors 31 and 32, and a reflection mirror 33, which separates the plurality of sub-beams irradiated by the integrator illumination optical system 20 into three color lights of red (R), green (G) and blue (B).

The dichroic mirrors 31 and 32 are optical elements having a wavelength-selecting film that reflects light beams of a predetermined wavelength and transmits light beams of other wavelength. The dichroic mirror 31 disposed on the upstream of the optical path is a mirror that transmits a red light and reflects the other color lights. The dichroic mirror 32 disposed on the downstream of the optical path is a mirror that reflects a green light and transmits a blue light.

The relay optical system 35 has an incident-side lens 36, a relay lens 38 and reflection mirrors 37 and 39, which introduces the blue light transmitting the dichroic mirror 32 of the color separating optical system 30 to the optical device 40. Incidentally, the relay optical system 35 is provided on the optical path of the blue light in order to prevent deterioration of light utilization efficiency caused by light dispersion etc. due to longer distance of the length of the optical path of the blue light than the length of the optical path of the other color lights. The relay optical system 35 is used for the blue light because the optical path of the blue light is long in the present embodiment, however, the optical path of the red light may be set long.

The red light separated by the above-described dichroic mirror 31 is bent by the reflection mirror 33 and is fed to the optical device 40 through a field lens 41. The green light separated by the dichroic mirror 32 is directly fed to the optical device 40 through the field lens 41. Further, the blue light is fed to the optical device 40 through the field lens 41 after being condensed and bent by the lenses 36 and 38 and the reflection mirrors 37 and 39 of the relay optical system 35. Incidentally, the field lenses 41 provided on the upstream of the respective color lights of the optical device 40 convert the respective sub-beams irradiated by the second lens array 22 into a light beam parallel to the illumination optical axis A.

The optical device 40 modulates the light beam incident thereon in accordance with image information to form a color image, which includes the liquid crystal panels 42 (42R, 42G, 4213) as an optical modulator to be illuminated and a cross dichroic prism 43 (a color-combining optical system). Incidentally, incident-side polarization plates 44 are interposed between the field lens 41 and the respective liquid crystal panels 42R, 42G and 42B and, though not illustrated, irradiation-side polarization plates are interposed between the respective liquid crystal panels 42R, 42G and 42B and the cross dichroic prism 43, the incident-side polarization plates 44, the liquid crystal panels 42R, 42G and 42B and the irradiation-side polarization plates modulating the respective incident color lights.

The liquid crystal panels 42R, 42G and 42B are constructed by sealing liquid crystal (electrooptic material) between a pair of transparent glass substrates, which modulates the polarization direction of the polarized light beam irradiated by the incident-side polarization plate 44 in accordance with given image signal using, for instance, polycrystalline silicon TFT as a switching element. The image formation areas of the liquid crystal panels 42R, 42G and 42B have rectangular profile having diagonal dimension of, for instance, 0.7 inch.

The cross dichroic prism 43 is an optical element for combining the optical images modulated for each color light irradiated by the irradiation-side polarization plate to form a color image. The cross dichroic prism 43 has a planarly-viewed square profile by attaching four right-angle prisms, and dielectric multi-layered films are formed on the boundaries adhering the respective right-angle prisms. One of the multi-layered films arranged in approximately X-shape reflects the red light and the other multi-layer film reflects the blue light, the multi-layered films bending the red light and the blue light to be aligned with the advancing direction of the green light, thereby combining the three color lights.

The color image irradiated by the cross dichroic prism 43 is enlarged and projected by the projection optical system 50 to form a wide screen image on a screen (not shown).

The above-described light source lamp unit 10 (i.e. a light source) is capable of being attached to and detached from the light guide 2, so that the light source lamp unit 10 can be exchanged when the light source lamp 11 is exploded or luminance of the lamp is deteriorated on account of life span thereof.

Figure 2:
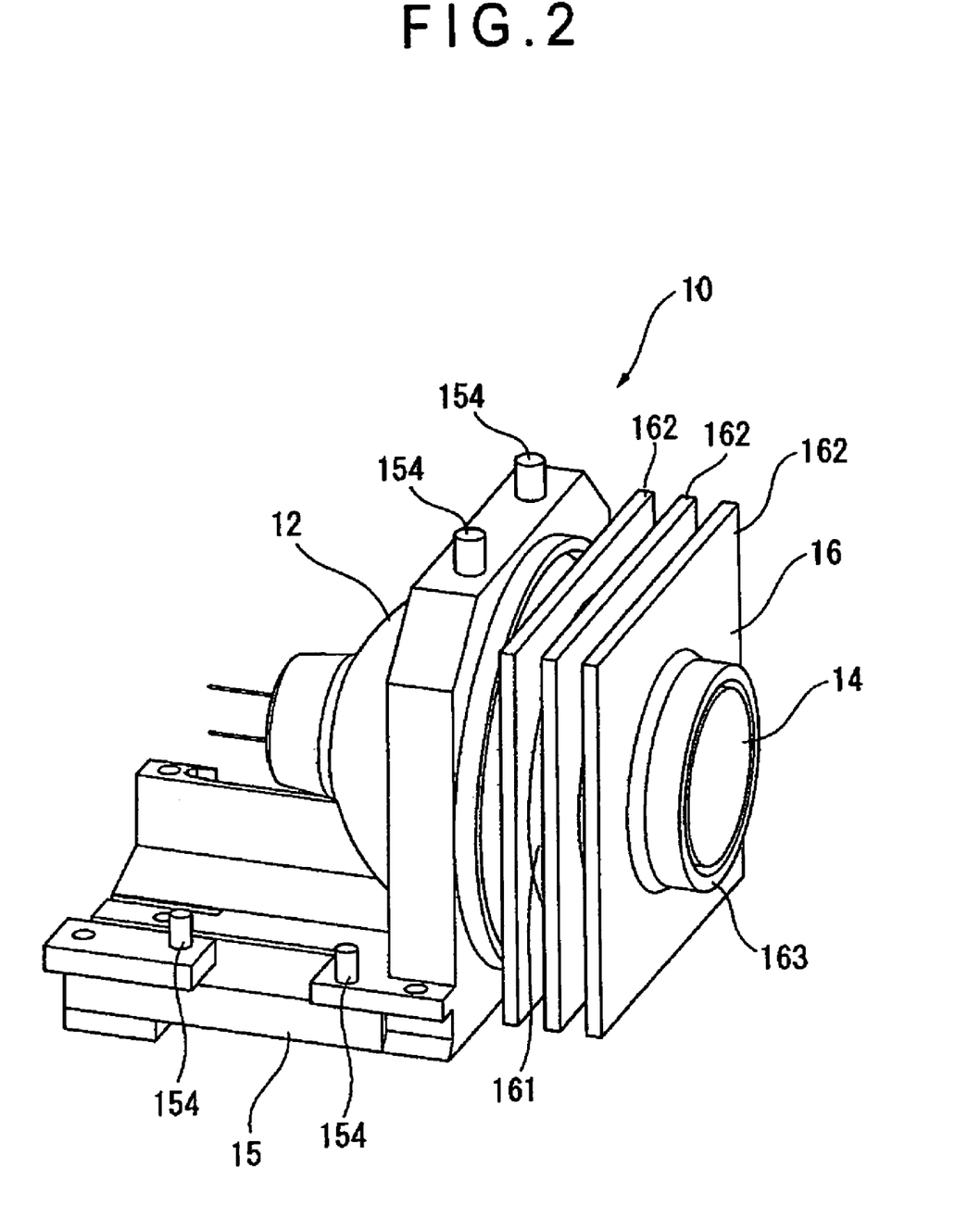
FIG. 2 is a perspective view showing an outline of a structure of a light source of the aforesaid embodiment.
Figure 3:
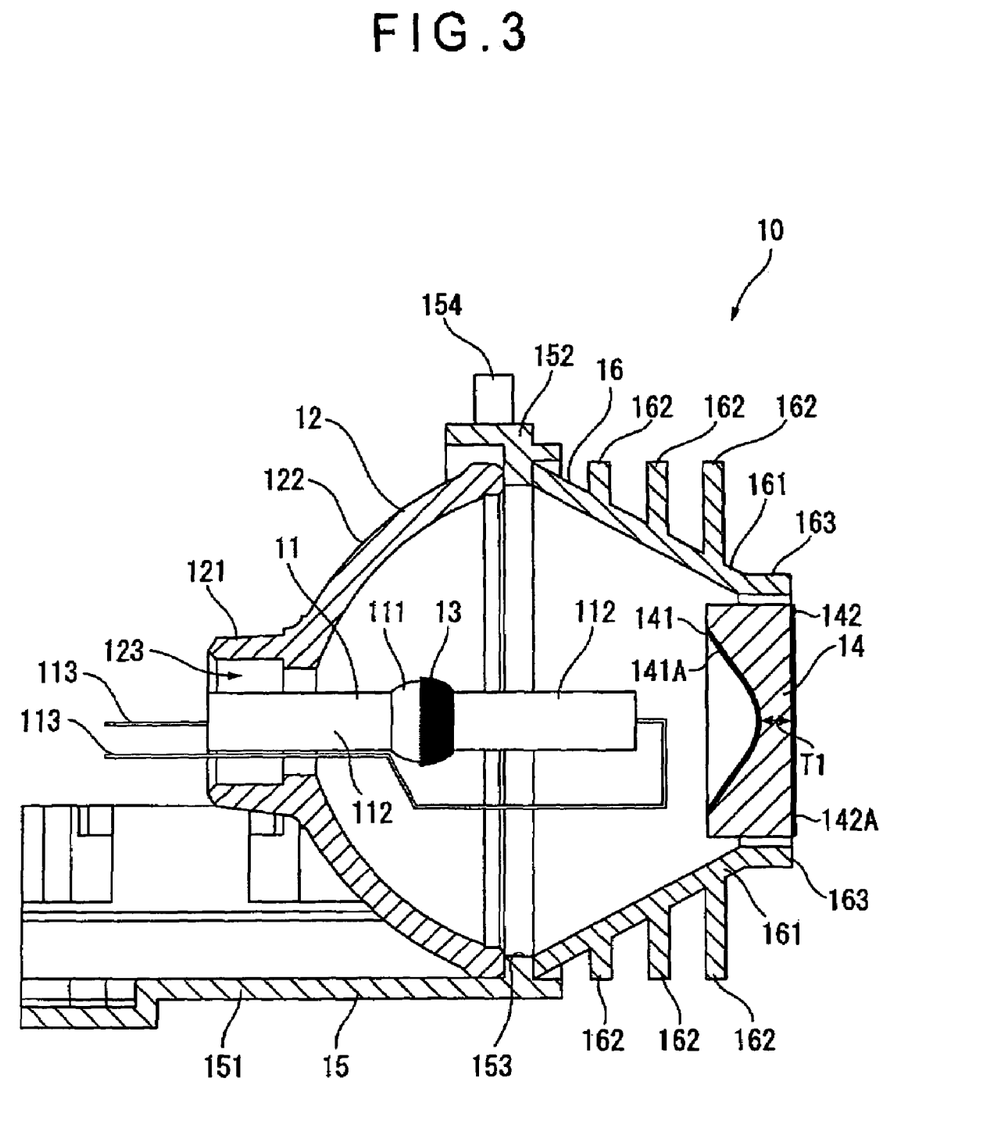
FIG. 3 is a cross sectional view showing the structure of the light source of the aforesaid embodiment.

Specifically, the light source lamp unit 10 includes a lamp housing 15 and a cover 16 as well as the above-described light source lamp 11, the ellipsoidal reflector 12, the sub-reflection mirror 13 and the parallelizing concave lens 14, as shown in FIGS. 2 and 3.

The light source lamp 11 (light-emitting tube) is constructed by silica glass tube having spherically bulged central portion, the central portion being a light-emitting portion 111 and the sections extending on both sides of the light-emitting portion 111 being sealing portions 112.

Though not illustrated in FIG. 3, a pair of tungsten electrodes spaced apart by a predetermined distance, mercury, rare gas and halogen are sealed inside the light-emitting portion 111.

Molybdenum foils electrically connected with the electrodes of the light-emitting portion 111 is inserted in the sealing portions 112, which are sealed by glass material etc. A lead wire 113 (electrode-connecting wire) is connected to the molybdenum foils, the lead wire 113 extending toward the outside of the light source lamp 11.

When a predetermined voltage is applied to the lead wire 113, electric discharge is generated between the electrodes so that the light-emitting portion 111 emits light.

The ellipsoidal reflector 12 is a glass integral molding having a neck portion 121 to which the sealing portion 112 of the light source lamp 11 is inserted and a reflecting portion 122 of ellipsoidal curved surface extending from the neck portion 121.

An insertion hole 123 is formed at the center of the neck portion 121, and the sealing portion 112 is disposed at the center of the insertion hole 123.

The reflecting portion 122 is constructed by depositing metal thin film on the ellipsoidal curved glass surface. The reflecting surface of the reflecting portion 122 is a cold mirror reflecting visible light and transmitting infrared radiation.

The light source lamp 11 is disposed inside the reflecting portion 122 so that the light-emitting center between the electrodes inside the light-emitting portion 111 is positioned at a first focus position L1 of the ellipsoidal curved surface of the reflecting portion 122.

Figure 4:
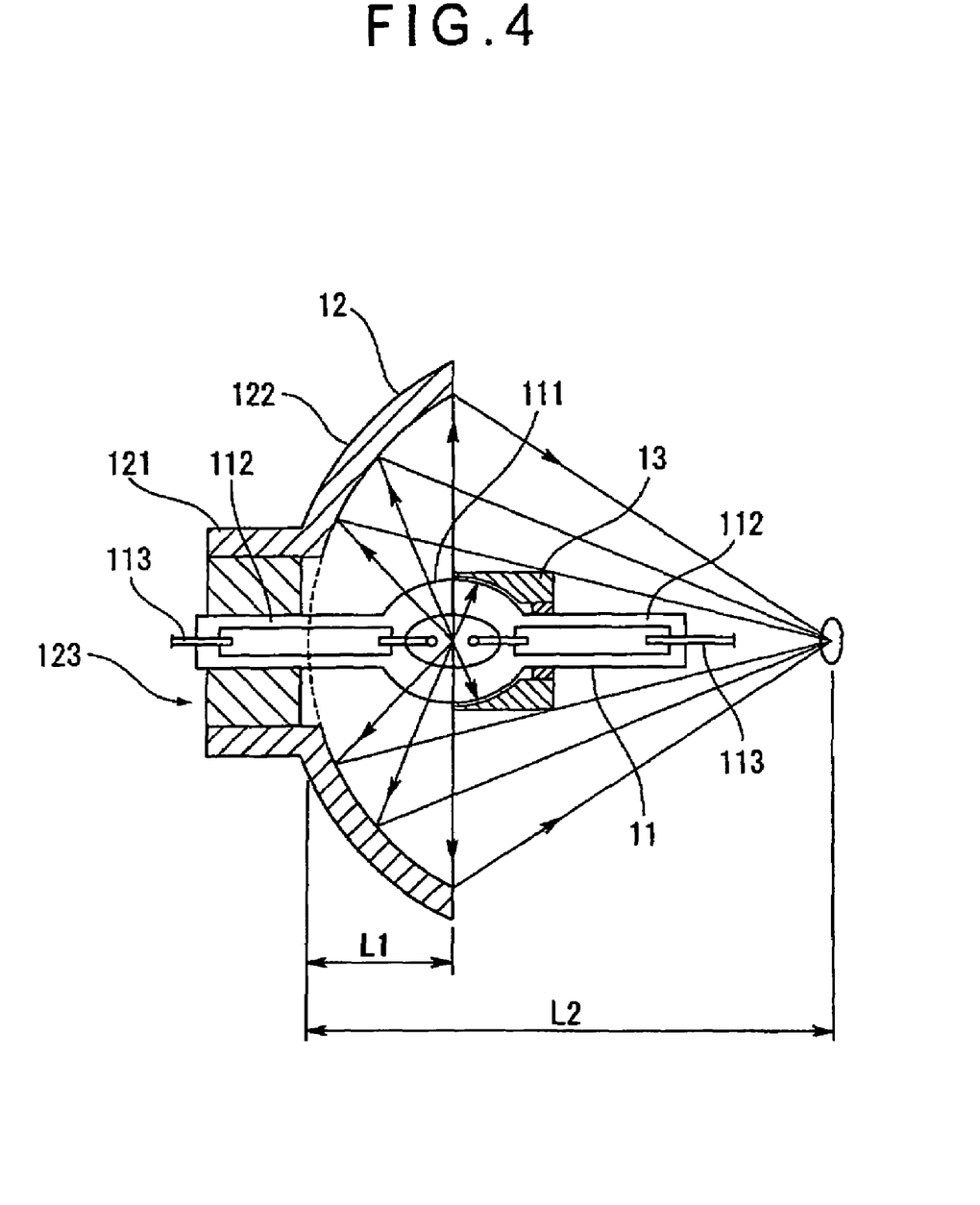
FIG. 4 is a schematic illustration showing how the light beam is emitted by the light source of the aforesaid embodiment.

When the light source lamp 11 is lit, the light beam irradiated by the light-emitting portion 111 is reflected by the reflecting surface of the reflecting portion 122 to be a convergent light converging at a second focus position L2 of the ellipsoidal curved surface of the reflecting portion 122 as shown in FIG. 4.

When the light source lamp 11 is fixed to the ellipsoidal reflector 12, the sealing portion 112 of the light source lamp 11 is inserted to the insertion hole 123 of the ellipsoidal reflector 12 so that the light-emitting center between the electrodes in the light-emitting portion 111 is located at the focus of the ellipsoidal curved surface of the reflecting portion 122, and inorganic adhesive having silica and alumina as main components is filled in the insertion hole 123. Incidentally, the lead wire 113 extending from the front sealing portion 112 is also exposed to the outside through the insertion hole 123 in the present embodiment.

The dimension of the reflecting portion 122 in the optical axis direction is shorter than the length of the light source lamp 11 so that the front sealing portion 112 of the light source lamp 11 protrudes from the light-irradiation opening of the ellipsoidal reflector 12 when the light source lamp 11 is fixed to the ellipsoidal reflector 12 as in the above.

The sub-reflection mirror 13 is a reflecting component covering approximately front (when the light-irradiating direction of the ellipsoidal reflector 12 is referred to as "front") half of the light-emitting portion 11 of the light source lamp 11, of which the reflecting surface has concave curved surface corresponding to the spherical surface of the light-emitting portion 111 and, though not shown, the reflecting surface thereof is arranged as a cold mirror in the same manner as the ellipsoidal reflector 12.

By attaching the sub-reflection mirror 13 to the light-emitting portion 111, the light beam irradiated to the front side of the light-emitting portion 111 is reflected toward the ellipsoidal reflector 12 by the sub-reflection mirror 13 to be irradiated from the reflecting portion 122 of the ellipsoidal reflector 12 as shown in FIG. 4.

With the use of the sub-reflection mirror 13, since the light beam irradiated to the front side of the light-emitting portion 111 is reflected to the rear side, the irradiating direction of the light beam emitted by the light-emitting portion 111 can be aligned even when the area of the ellipsoidal curve of the reflecting portion 122 is small, and the dimension of the ellipsoidal reflector 12 in the optical axis direction can be reduced.

The parallelizing concave lens 14 parallelize the light beam irradiated by the light source lamp 11, of which a light-incident surface 141 has an aspherical (hyperboloid, for instance) concave surface and a light-irradiation surface 142 has a flat surface as shown in FIG. 3. Dimension T1 of the thinnest part of the parallelizing concave lens 14 along the light transmission direction, i.e. between the part of the concave surface most dented toward the light-irradiation surface 142 side and the light-irradiation surface 142, is 2 mm or more, for instance, 3 mm.

An anti-reflection film 141A is coated on the light-incident surface 141 of the parallelizing concave lens 14, which enhances the light utilization efficiency. An ultraviolet protection film 142A is formed on the light-irradiation surface 142 of the parallelizing concave lens 14. The ultraviolet protection film 142A reflects ultraviolet to avoid the transmission of the ultraviolet, thereby preventing the ultraviolet from being irradiated by the light source lamp unit 10. Incidentally, the ultraviolet protection film 142A is a general-type ultraviolet protection film used for parallel incident light.

As shown in FIG. 3, the lamp housing 15 is an integral molding of L-shaped cross section made of synthetic resin, which has a horizontal section 151 and a vertical section 152.

The horizontal section 151 is engaged with the wall of the light guide 2 to prevent light leakage by hiding the light source lamp unit 10 in the light guide 2. Further, though not illustrated, a terminal block for electrically connecting the light source lamp 11 with an external power source is provided on the horizontal section 151, the terminal block being connected with the lead wire 113 of the light source lamp 11.

The vertical section 152 is for determining the position of the ellipsoidal reflector 12 in the optical axis direction, to which a distal end of the ellipsoidal reflector 12 on the light-irradiation opening side is fixed by an adhesive etc. in the present embodiment. An opening 153 for transmitting the light beam irradiated by the ellipsoidal reflector 12 is formed on the vertical section 152.

A projection 154 is formed on the horizontal section 151 and the vertical section 152. The projection 154 is engaged with a recess formed in the light guide 2 so that the light-emitting center of the light source lamp 11 is disposed on the illumination optical axis A of the light guide 2.

The cover 16 is attached to cover the light-irradiation opening of the ellipsoidal reflector 12, which is an integral metal molding including a heat-absorber 161 of approximately conic cylinder attached to the opening 153 of the vertical section 152 of the lamp housing 15, a plurality of heat-radiation fins 162 projecting on the outside of the heat absorber 161, and a lens attachment 163 formed on the distal end of the heat absorber 161.

The heat absorber 161 absorbs radiation heat radiated by the light source lamp 11 and the heat of air convecting in the sealed space in the ellipsoidal reflector 12 and the cover 16, the inner surface of the heat absorber 161 being coated with anodized black-aluminum. The approximately conic slanted surface of the heat absorber 161 is parallel to the inclination of the light converged by the ellipsoidal reflector 12 to minimize the light beam irradiated by the ellipsoidal reflector 12 to be irradiated on the inner surface of the heat absorber 161.

The plurality of heat-radiation fins 162 are plate members extending orthogonal to the optical axis of the light source lamp unit 10 and gaps capable of sufficiently passing the cooling air is formed between the respective heat-radiation fins 162.

The lens attachment 163 is constructed by a cylindrical body projecting on the distal end of the heat absorber 161, and the parallelizing concave lens 14 for parallelizing the convergent light of the ellipsoidal reflector 12 is attached to the cylindrical portion. Incidentally, though not illustrated, the parallelizing concave lens 14 is fixed to the lens attachment 163 by an adhesive etc. When the parallelizing concave lens 14 is attached to the lens attachment 163, the space inside the light source lamp unit 10 is completely sealed so that the broken pieces do not scatter to the outside even when the light source lamp 11 is exploded.

The light source lamp unit 10 is accommodated in the light guide 2 of the projector 1. Incidentally, though not shown in FIG. 1, the projector 1 has a cooling fan adjacent to the light source lamp unit 10, the cooling fan blowing cooling air along the extending direction of the heat-radiation fin 162 of the cover 16. Alternatively, the heat-radiation fin may be arranged obliquely relative to the optical axis in accordance with the direction of the cooling air.

Next, cooling process of the light source lamp 11 of the projector 1 will be described below.

Initially the projector 1 is switched on and the light source lamp 11 is lit to irradiate white light, which simultaneously generates a radiation heat by the light source lamp 11. At this time, the cooling fan inside the projector 1 is actuated to start cooling the heat-radiation fin 162.

The infrared radiation radiated toward the front side of the light source lamp 11 is transmitted through the sub-reflection mirror 13 and is absorbed by the heat absorber 161 of the cover 16. The air heated by the radiation heat causes an internal convection and the heated air is heat-exchanged by the inner surface of the heat absorber 161 of the cover 16 where the heat is absorbed and the air is cooled. The heat absorbed by the heat absorber 161 is transmitted to the heat-radiation fin 162, where the heat-exchange is conducted by the cooling air from the cooling fan to cool the heat-radiation fin.

According to the above-described first embodiment, following advantages can be obtained.

(1-1) Since the cover 16 is made of metal having excellent heat-conductivity, the radiation heat generated by the light source lamp 11 can be absorbed by the heat absorber 161 and discharged by the heat-radiation fin 162, so that no cooling-air-introducing opening as in a conventional arrangement is necessary to be formed on the ellipsoidal reflector 12 and completely sealed explosion-proof construction can be achieved without increasing the number of components of the light source lamp unit 10.

(1-2) Since the cover 16 is constructed by integral metal molding, the cover 16 is not deteriorated by the heat of the light source lamp 11, no harmful gas such as siloxane is generated, and the waste material of the cover 16 of the light source lamp unit 10 after the light source lamp 11 is exploded can be melt again to be used for the other purposes.

(1-3) Since the sub-reflection mirror 13 is provided on the light source lamp 11, the light beam irradiated from the center of the light-emitting portion 1 11 to the front side is again returned to the light-emitting portion 111 by the sub-reflection mirror 13 and to be incident on the ellipsoidal reflector 12 as in the light beam irradiated rearward from the center of the light-emitting portion 111, so that no reflecting portion 122 is necessary on the front side of the light-emitting portion 111 and the length of the reflecting portion 122 of the ellipsoidal reflector 12 in the optical axis direction can be diminished, thereby reducing the size of the light source lamp unit 10.

(1-4) Since the heat absorber 161 is constructed by approximately conic cylinder body, even when the light beam reflected by the ellipsoidal reflector 12 is irradiated on the heat absorber 161, the reflected light beam does not return to the ellipsoidal reflector 12 as a stray light, thereby achieving the light source lamp unit 10 capable of irradiating appropriate light beam.

(1-5) Since the heat-radiation fin 162 is constructed by plates orthogonal to the optical axis direction of the ellipsoidal reflector 12, the heat-radiation fin 162 can be efficiently cooled by disposing the cooling fan on a side of the light source lamp unit 10, thereby enhancing the cooling efficiency of the light source lamp 11.

(1-6) Since the parallelizing concave lens 14 is attached to the lens attachment 163 of the cover 16 to seal the light source lamp 11, the number of the components of the light source lamp unit 10 can be further reduced.

(1-7) When the thickness of the parallelizing concave lens along the light-transmitting direction is less than 2 mm, the parallelizing concave lens may be damaged by the explosion of the light source lamp 11. On the other hand, since the thickness of the parallelizing concave lens 14 is 2 mm or more in the present embodiment, enough strength can be secured for the parallelizing concave lens 14, so that the parallelizing concave lens 14 is not damaged even when the light source lamp 11 is exploded, thereby securely preventing dispersion of the broken pieces of the exploded light source lamp 11.

(1-8) Further, since the light-incident surface 141 of the parallelizing concave lens 14 is an aspherical concave surface and the light-irradiation surface 142 is made flat, the light is not refracted by the light-irradiation surface 142, thereby improving parallelism of the irradiated light beam.

Since the light-incident surface 141 of the parallelizing concave lens 14 is concaved, interference of the parallelizing concave lens 14 with the sealing portion 112 of the light source lamp 11 and the lead wire 113 connected to the sealing portion 112 can be prevented.

Since the light-incident surface 141 of the parallelizing concave lens 14 is arranged as a concave surface, the broken pieces of the light source lamp 11 are not likely to collide with the parallelizing concave lens 14 even when the light source lamp 11 is exploded, thereby further securely preventing the damage of the parallelizing concave lens 14.

(1-9) Since the light-incident surface 141 of the parallelizing concave lens 14 is concaved, which does not protrude toward the inside of the cover 16, the convection of the air generated inside the cover 16 is not blocked, so that the heat-exchange on the inside of the heat absorber 161 of the cover 16 is not hindered. Accordingly, the heat can be efficiently exchanged, thereby enhancing cooling efficiency.

(1-10) Since the ultraviolet protection film 142A is formed on the light-irradiation surface 142 of the parallelizing concave lens 14, the emission of the ultraviolet from the light source lamp unit 10 can be prevented. Accordingly, deterioration of the liquid crystal panels 42R, 42G and 42B caused by the ultraviolet can be prevented.

Further, when the ultraviolet protection film is formed on the concave surface side of the parallelizing concave lens, the function of the ultraviolet protection film may not be fully exerted. On the other hand, in the present embodiment, since the ultraviolet protection film 142A is formed on the flat surface side of the parallelizing concave lens 14, the function of the ultraviolet protection film 142A can be fully exerted.

(1-11) The parallelizing concave lens 14 has aspherical concave light-incident surface 141, so that the light beam is parallelized on the light-incident surface 141 side and the parallelized light is irradiated from the light-irradiation surface 142. Accordingly, when the ultraviolet protection film is formed on the light-incident surface 141, special ultraviolet protection film in accordance with the incident angle of the light beam has to be used. On the other hand, since the ultraviolet protection film 142A is formed on the light-irradiation surface 142 and the parallelized light beam is incident on the ultraviolet protection film 142A, general-type ultraviolet protection film 142A having light-incident angle of zero degree can be used. Accordingly, the production cost of the light source lamp unit 10 can be reduced.

(1-12) The ultraviolet protection film 142A formed on the light-irradiation surface 142 of the parallelizing concave lens 14 reflects the ultraviolet to prevent transmission of the ultraviolet. The ultraviolet reflected by the ultraviolet protection film 142A is incident on the light source lamp 11, however, since the light source lamp 11 irradiates light beam having longer wavelength than the incident ultraviolet, the intensity of the visible light irradiated by the light source lamp 11 can be improved.

(1-13) When the light source lamp unit 10 is used for the projector 1, since the size of the light source can be reduced, the size of the respective optical components can also be reduced, thereby reducing the size of the entire projector 1.

Next, a second embodiment of the present invention will be described below. Incidentally, the same reference numeral will be attached to the components identical with or similar to the above-described components to omit the description thereof.

In the light source lamp unit 10 according to the first embodiment, the lead wire 113 on the front side of the light source lamp 11 is drawn to the outside from the insertion hole 123 of the ellipsoidal reflector 12.

Figure 5:
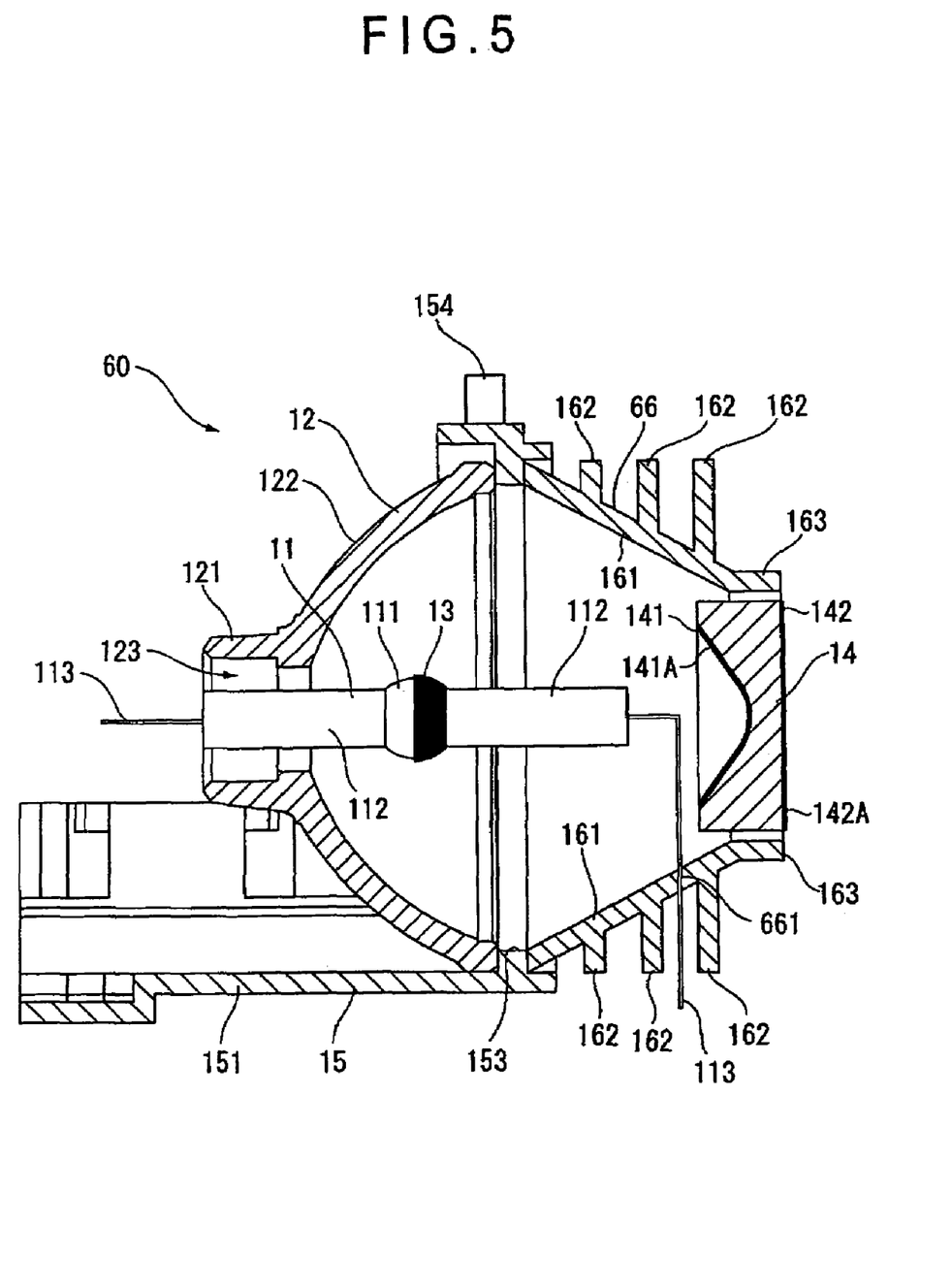
FIG. 5 is a cross sectional view showing a structure of a light source according to a second embodiment of the present invention.

On the other hand, a light source lamp unit 60 according to the second embodiment has a hole 661 formed on a cover 66, from which the front-side lead wire 113 is drawn out as shown in FIG. 5.

The cover 66 is a ceramics molding with the hole 661 formed on the lower side of the light source lamp 11. Incidentally, though not shown in FIG. 5, the hole 661 is sealed by rubber or the like to secure the internal sealability thereof.

The hole 661 is formed at a position for the lead wire 113 to be not displayed as a shadow by the light irradiated by the light source lamp 11. In the present embodiment, the lead wire 113 is located so that the shadow thereof extends between the small lenses of the first lens array 21 disposed on the downstream of the light source lamp unit 10.

According to the light source lamp unit 60 according to the second embodiment, following advantage as well as the above-described advantages (1-1) to (1-13) can be obtained.

(2-1) Since the hole 661 for drawing out the lead wire 113 is formed on the cover 66, there is no need for forming a hole for drawing out the lead wire on the ellipsoidal reflector 12, so that the distortion of the ellipsoidal reflector 12 generated in molding the reflector can be prevented and a reflector having optically higher accuracy can be used as the light source lamp unit 60.

Incidentally, the scope of the present invention is not restricted to the above-described embodiments, but includes following modifications.

Though a high-pressure mercury lamp having the light-emitting portion 111 in which mercury is sealed is used as the light source lamp 11 in the above embodiments, the present invention may be applied for a metal halide lamp.

Though the heat-absorber 161 of the cover 16 is configured as an approximately conic cylinder in the present embodiment, a cup-shaped or box-shaped cover may be used.

Though the parallelizing concave lens 14 having the aspherical concave light-incident surface 141 and the flat light-irradiation surface 142 is used in the above embodiments, a parallelizing concave lens having a flat light-incident surface and an aspherical concave light-irradiation surface may be used.

Though the anti-reflection film 141A is formed on the light-incident surface 141 of the parallelizing concave lens 14 in the present embodiment, the anti-reflection film may be omitted. Though the Ultraviolet protection film 142A is formed on the light-irradiation surface 142, the Ultraviolet protection film 142A may be omitted. According to the above arrangement, since the process for forming anti-reflection film and the Ultraviolet protection film can be omitted, the production process of the light source lamp unit 10 can be simplified.

Though the interior of the cover 16 is sealed by attaching the parallelizing concave lens 14 to the lens attachment 163 of the cover 16, such arrangement is not limiting. A flat glass transparent plate may be attached to an opening formed on the cover and the convex lens etc. may be formed on the downstream thereof to parallelize the light.

Though the light source lamp unit 10 as the light source of the present invention is used for the projector 1 having the liquid crystal panels 42R, 42G and 42B in the present embodiment, the light source of the present invention may be applied to the projector provided with an optical modulator using a micro-mirror.

Though a cooling fan is used as a cooling device of the light source lamp unit 10 in the above embodiments, the light source lamp unit 10 may be cooled by a cooling device having a thermoelectric conversion element using the Peltier effect.

Though the present invention is applied for the light source lamp unit 10 having the light source lamp 11 provided with the sub-reflection mirror 13, the present invention may be applied to a light source with a light source lamp having no sub-reflection mirror.

Specific configuration and arrangement in implementing the present invention may be designed in any manner as long as an object of the present invention can be achieved.

What is claimed is:

1. A light source, comprising:
   a light-emitting tube having a light-emitting portion that emits a light beam by an electric discharge between electrodes and sealing portions provided on both sides of the light-emitting portion;
   a reflector that reflects the light beam emitted by the light-emitting portion forward after aligning in a predetermined direction;
   a cover covering a light-irradiation opening of the reflector, the cover having an opening for irradiating the light beam reflected by the reflector and a heat-radiation fin formed on the outside thereof, the cover being made of a heat-conductive material that absorbs a heat generated by the light-emitting tube and conducts the absorbed heat to the heat-radiation fin; and
   a transparent member that covers the opening of the cover, the transparent member sealing an inside of the light source defined by the reflector, the cover and the transparent member.

2. The light source according to claim 1,
   wherein the reflector is an ellipsoidal reflector having an ellipsoidal reflecting surface,
   wherein a sub-reflection mirror that covers approximately half of the front side of the light emitting portion is provided in the light-emitting tube, the light-emitting tube being projected from a light-irradiation opening of the ellipsoidal reflector.

3. The light source according to claim 1, wherein the cover is made of ceramics and a hole for inserting an electrode-connecting wire of the light-emitting tube is formed on the cover.

4. A projector that modulates a light beam irradiated by a light source in accordance with image information to form an optical image and projects the optical image in an enlarged manner, comprising:
   a light source according to claim 1.

5. The projector according to claim 4, further comprising a cooling device that cools the heat-radiation fin formed on the cover of the light source.

6. The projector according to claim 4,
   wherein the reflector is an ellipsoidal reflector having an ellipsoidal reflecting surface,
   wherein a sub-reflection mirror that covers approximately half of the front side of the light emitting portion is provided in the light-emitting tube, the light-emitting tube being projected from a light-irradiation opening of the ellipsoidal reflector.

7. The projector according to claim 4, wherein the cover is made of ceramics and a hole for inserting an electrode-connecting wire of the light-emitting tube is formed on the cover.

8. The projector according to claim 6, the cover comprising an approximately conic cylindrical heat absorber that is tapered from the light-irradiation opening of the reflector in a direction for the light to be irradiated.

9. The projector according to claim 8, wherein the heat-radiation fin is a plate provided on the outside of the heat-absorber extending in a direction orthogonal to the optical axis of the reflector.

10. The projector according to claim 6, wherein the transparent member is a parallelizing lens that parallelizes a convergent light irradiated by the ellipsoidal reflector.

11. The projector according to claim 10, wherein the parallelizing lens is a parallelizing concave lens having thickness of 2 mm or more along a direction for the light to be transmitted.

12. The projector according to claim 10, wherein the parallelizing lens is a parallelizing concave lens having an aspherical concave surface on a light-incident side thereof and a flat surface on a light-irradiation side thereof.

13. The projector according to claim 12, wherein the aspherical surface is a hyperboloid.

14. The projector according to claim 12, wherein an ultraviolet protection film that prevents transmission of ultraviolet is formed on the light-irradiation side of the parallelizing concave lens.

15. The light source according to claim 2, the cover comprising an approximately conic cylindrical heat absorber that is tapered from the light-irradiation opening of the reflector in a direction for the light to be irradiated.

16. The light source according to claim 15, wherein the heat-radiation fin is a plate provided on the outside of the heat-absorber extending in a direction orthogonal to the optical axis of the reflector.

17. The light source according to claim 2, wherein the transparent member is a parallelizing lens that parallelizes a convergent light irradiated by the ellipsoidal reflector.

18. The light source according to claim 17, wherein the parallelizing lens is a parallelizing concave lens having thickness of 2 mm or more along a direction for the light to be transmitted.

19. The light source according to claim 17, wherein the parallelizing lens is a parallelizing concave lens having an aspherical concave surface on a light-incident side thereof and a flat surface on a light-irradiation side thereof.

20. The light source according to claim 19, wherein the aspherical surface is a hyperboloid.

21. The light source according to claim 19, wherein an ultraviolet protection film that prevents transmission of ultraviolet is formed on the light-irradiation side of the parallelizing concave lens.

* * * * *